United States Patent
Rohrl et al.

(10) Patent No.: US 9,846,670 B2
(45) Date of Patent: Dec. 19, 2017

(54) SYSTEM AND METHOD FOR EVALUATING A STREAM OF SENSOR DATA FOR VALUE DOCUMENTS

(71) Applicant: GIESECKE & DEVRIENT GMBH, Munich (DE)

(72) Inventors: Wolfgang Rohrl, Riemerling (DE); Oliver Hartmann, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 213 days.

(21) Appl. No.: 14/650,816

(22) PCT Filed: Dec. 11, 2013

(86) PCT No.: PCT/EP2013/003751
§ 371 (c)(1),
(2) Date: Jun. 9, 2015

(87) PCT Pub. No.: WO2014/090405
PCT Pub. Date: Jun. 19, 2014

(65) Prior Publication Data
US 2015/0317268 A1    Nov. 5, 2015

(30) Foreign Application Priority Data
Dec. 13, 2012    (DE) .................. 10 2012 024 397

(51) Int. Cl.
*G06F 13/00*    (2006.01)
*G06F 13/40*    (2006.01)
(Continued)

(52) U.S. Cl.
CPC ...... *G06F 13/4027* (2013.01); *G06F 13/4221* (2013.01); *G07D 7/00* (2013.01); *G07D 7/08* (2013.01); *G07D 7/121* (2013.01)

(58) Field of Classification Search
CPC .... G06F 13/4027; G06Q 40/02; G07D 7/121; G07D 7/00
See application file for complete search history.

(56) References Cited

U.S. PATENT DOCUMENTS 4,549,661 A    10/1985    Morishita et al.
5,974,883 A *  11/1999    Ross ...................... G07D 7/164
                                                             194/206

(Continued)

FOREIGN PATENT DOCUMENTS

CN    1667638 A    9/2005
DE    19618541 A1    11/1996
(Continued)

OTHER PUBLICATIONS

Butts, Mike, "Synchronization Through Communication in a Massively Parallel Processor Array", IEEE Computer Society, Sep.-Oct. 2007, pp. 32-40.
(Continued)

*Primary Examiner* — Tammara Peyton
(74) *Attorney, Agent, or Firm* — Workman Nydegger

(57) ABSTRACT

A system for evaluating a stream of sensor data formed by means of at least one sensor for a plurality of value documents includes at least two evaluation units and a data bus. Each of the evaluation units has first and second interfaces for receiving or transferring the sensor data stream with the sensor data, a third interface for receiving and transferring evaluation data, a working memory, at least one processor connected to the working memory for evaluating the sensor data in the working memory, and a relaying device connected to the first and the second interfaces and to the working memory for receiving a sensor data stream received via the first interface, at least partial relaying to the second interface and to storage of at least part of the data of the
(Continued)

sensor data stream in the working memory, with the data bus being connected to the third interface.

25 Claims, 3 Drawing Sheets

(51) Int. Cl.
*G06F 13/42* (2006.01)
*G07D 7/00* (2016.01)
*G07D 7/08* (2006.01)
*G07D 7/121* (2016.01)

(56) References Cited

U.S. PATENT DOCUMENTS

| | | | | |
|---|---|---|---|---|
| 6,074,081 | A | 6/2000 | Smith et al. | |
| 6,151,534 | A | 11/2000 | Smith et al. | |
| 7,571,796 | B2* | 8/2009 | Stenzel | G07D 7/181 194/206 |
| 8,162,125 | B1* | 4/2012 | Csulits | G07D 7/12 194/206 |
| 8,380,573 | B2* | 2/2013 | Jones | G06K 9/033 235/379 |
| 8,989,433 | B2* | 3/2015 | Kasuya | G07D 7/00 382/100 |
| 9,600,952 | B2* | 3/2017 | Domke | G07D 7/08 |
| 2002/0173874 | A1 | 11/2002 | Lax | |
| 2005/0201609 | A1 | 9/2005 | Nakamura et al. | |
| 2008/0283450 | A1* | 11/2008 | Hemming | G07D 11/0036 209/534 |
| 2009/0087077 | A1* | 4/2009 | Nireki | G07D 7/12 382/135 |
| 2013/0251235 | A1* | 9/2013 | Lax | G06Q 40/02 382/138 |

FOREIGN PATENT DOCUMENTS

| | | |
|---|---|---|
| DE | 10 2008 064 389 A1 | 6/2010 |
| DE | 10 2009 048 241 A1 | 4/2011 |
| EP | 1575001 A2 | 9/2005 |
| EP | 2482256 A1 | 8/2012 |

OTHER PUBLICATIONS

Karam, Lina J. et al., "Trends in Multicore DSP Platforms", IEEE Signal Processing Magazine, Nov. 2009, pp. 38-49.
Osorio, Roberto R. et al., "High Performance Image Processing on a Massively Parallel Processor Array", IEEE 12th Euromicro Conference on Digital System Design/Architecture, Methods and Tools, 2009, pp. 233-236.
German Search Report from corresponding DE Application No. 10 2012 024 397.9, dated Aug. 5, 2013.
International Search Report from corresponding PCT Application No. PCT/EP2013/003751, dated Mar. 25, 2014.
International Preliminary Report on Patentability from corresponding PCT Application No. PCT/EP2013/003751, dated Jun. 16, 2015.

* cited by examiner

SYSTEM AND METHOD FOR EVALUATING A STREAM OF SENSOR DATA FOR VALUE DOCUMENTS

BACKGROUND

The present invention relates to a system and a method for evaluating a stream of sensor data that have been formed by means of at least one sensor for a plurality of value documents.

Value documents are understood here to be sheet-shaped objects that represent for example a monetary value or an authorization and hence should not be manufacturable arbitrarily by unauthorized persons. They hence have features that are not simple to manufacture, in particular to copy, whose presence is an indication of authenticity, i.e. manufacture by an authorized body. Important examples of such value documents are coupons, vouchers, checks and in particular bank notes.

Such value documents are frequently checked by machine for their authenticity and/or their state. This is done using value-document processing apparatuses having sensors by means of which physical properties of value documents, for example optical and/or magnetic properties and/or ultrasonic properties, are captured and corresponding sensor data describing the properties are formed. Said sensor data are evaluated in real time by pre-specified methods in order to ascertain properties of the value documents, for example the type of the value document, in bank notes the currency and denomination, the authenticity, the soiling or a serial number, and/or to assign the value documents to sorting classes according to which the value documents can be sorted.

SUMMARY

Modern value-document processing apparatuses for value documents in the form of bank notes are characterized by a high throughput of bank notes, which may be more than 40 bank notes per second, and the employment of sensors, in particular optical sensors, with high spatial resolution. Through the high throughput and the great amount of sensor data for each individual value document due to the high resolution, there hence arises a very great stream of sensor data for the value documents which has to be processed in real time. In particular, for each individual value document only a very short time is available for evaluation. To enable an adequately fast evaluation a very high computing power is necessary, but this can usually only be made available through elaborate and expensive computers. A further problem is that the requirements for the necessary computing power can change depending on the number and nature of the sensors and the processing speed.

The present invention is hence based on the object of providing a system and method for evaluating a stream of sensor data for value documents that enables a fast evaluation of the sensor data and can be simply realized.

This object is achieved by a system for evaluating a stream of sensor data that have been formed by means of at least one sensor for a plurality of value documents and describe physical properties of the value documents, preferably in real time, which has at least two evaluation units and a data bus. In this evaluation system, each of the evaluation units has a first interface for receiving the sensor data stream or part of the sensor data stream with the sensor data, a second interface for transferring at least part of the sensor data stream, a third interface for receiving and/or transferring evaluation data, a working memory, at least one processor connected to the working memory for evaluating the sensor data in the working memory, and a relaying device connected to the first and second interfaces and directly or indirectly to the working memory for receiving a sensor data stream received via the first interface, at least partial relaying to the second interface and the at least partial relaying to the processor and/or to storage of at least part of the sensor data of the sensor data stream in the working memory. The third interface, in each case, is connected to the processor and/or the working memory. Further, the data bus is connected respectively to the third interfaces.

The connections are respectively signal connections which allow a communication between the respective components.

The evaluation system according to the invention enables an at least partly parallel evaluation of the sensor data stream in the at least two evaluation units, with only comparatively simple processors needing to be employed while nevertheless a high processing speed can be achieved. There is no need to use especially expensive processors. The sensor data describe physical properties of value documents, for example the spatially resolved optical remission of one side of the value document or the spatially resolved optical transmission.

Preferably, the evaluation units are so adapted that the stated interfaces, the relaying device, the working memory and the processor are disposed on only one circuit board. This results in a modular construction which enables a simple design of the evaluation system.

The evaluation system according to the invention enables an at least partly parallel evaluation of the sensor data stream, preferably in real time. The stream of sensor data will preferably not be a continuous stream, but have portions with a high data transfer rate and ones with low or no data transfer in accordance with the time interval of the capture of sensor data, i.e. the time interval of the value documents on the at least one sensor. For this purpose there are first provided the first and second interfaces, which are preferably interfaces with great bandwidth. Via the first interface the sensor data stream can be received. The latter can then be relayed by the relaying device at least partly, with preprocessing of the sensor data, where applicable, to the second interface, and be relayed by the latter to a next evaluation unit. The relaying device is also connected to the working memory, however, so that it can store at least part of the received sensor data stream in the working memory. The relaying of the sensor data to the working memory can be effected directly or indirectly, i.e. the relaying device can write the sensor data directly to the working memory or with involvement of the processor, for example. For both cases corresponding signal connections must then be present. Preferred is the direct connection between relaying device and working memory, which allows direct storage and thereby relieves the processor.

Relaying is understood here to mean that the sensor data are fed unchanged to the interface or directly or indirectly to the working memory or that they are preprocessed and/or filtered. Different possibilities will be described hereinafter.

Preferably, the relaying device is programmable, so that the evaluation system, as to be explained hereinafter, can be adjusted to different evaluation tasks. In particular, different relaying devices can be programmed differently. Particularly preferably, the relaying device comprises a programmable logic gate circuit, also referred to as an FPGA (field programmable gate array). This design has the advantage that a very great processing speed is made possible.

To enable a control of the relaying device, the latter is preferably connected to the processor via a control connection. The processor is then preferably adapted, and in particular programmed, for controlling the relaying device. For programming there is stored in the evaluation device corresponding program code, which is executed by the processor. Program code within the scope of the present invention not only comprises instructions of a program, but can furthermore also contain pre-specified configuration data employed upon execution of the program code.

The processor serves in particular for evaluating the sensor data in the working memory. The evaluation unit can for this purpose have program code stored in a program memory of the evaluation unit or the working memory, upon whose execution the processor carries out an evaluation method, pre-specified by the program code, while employing the sensor data stored in the working memory of the evaluation unit.

Upon evaluation of the sensor data, the processor generates evaluation data which other evaluation units of the evaluation system or at least one component of a value-document processing apparatus having the evaluation system employs. For transferring evaluation data and/or for receiving evaluation data of other evaluation devices, in particular of another evaluation unit of the evaluation system, there is used the third interface which is connected to the processor and/or the working memory. Upon reception of evaluation data, the latter can be written to the working memory directly or by means of the processor, depending on the embodiment; however, it is also possible that they are processed directly in the processor. Since the amount of the evaluation data is typically much smaller than that of the sensor data, the third interface can have a lower bandwidth than the first and second interfaces.

The third interfaces are connected to the data bus. In this manner an exchange of evaluation data between the evaluation units can be enabled independently of the relaying of the sensor data, depending on the evaluation method. Further, the data bus can preferably be connected via data interfaces to the at least one component of the value-document processing apparatus having the evaluation system, in order to deliver evaluation data to these other components or receive data therefrom.

For operating a sensor connected to the evaluation system via the first interface of one of the evaluation units, a control or configuration of the sensor is necessary, where applicable. Preferably, at least one of the evaluation units hence has a fourth interface connected to the processor for transferring control data to the sensor.

Via the data bus, evaluation data can be exchanged between the evaluation units, as stated above. However, such a bus connection may be too slow for certain evaluation methods. But it is also possible that, in certain evaluation methods, evaluation data need to be exchanged between only two evaluation units, which would lead to unnecessary data traffic on the bus. It is hence preferred that at least one of the evaluation units has a fifth interface connected to the processor and/or the working memory for receiving and/or transferring evaluation data. Through connection of the fifth interfaces there can thus be enabled a fast exchange of evaluation data between the evaluation units interconnected via the fifth interfaces.

Upon use of the evaluation system not all interfaces need to be employed, depending on the nature and extent of the sensor data. It is hence preferred that, in the evaluation system, at least one of the interfaces has an attachment element for a plug connection, which is preferably accessible without removal of the evaluation units. The attachment element may be in particular a plug or a coupler or a receiving means for a complementary plug. A data connection can then be established simply, also subsequently, by connecting for example two evaluation units by means of a cable or an element with at least one optical fiber with suitable attachment elements.

Preferably, in the evaluation system, the evaluation units are identically adapted, except for program code stored therein, where applicable. The program code can be identical or different. This embodiment enables a simple, modular and cost-efficient construction of the evaluation system, along with the further advantage of scalability. In particular, standard processors in a standard hardware environment can be employed, which simplifies and reduces the cost of the manufacture of the evaluation units. Furthermore, the evaluation system can be easily adjusted to different customer requirements; for value-document processing apparatuses can differ, depending on the customer requirement, for example in their singling speed and transport speed and thus the data rate of the sensor data stream and the nature of the evaluation of the sensor data, for example with or without recognition of the serial number of bank notes.

The interfaces can be interconnected depending on the number of the sensors and the nature of the evaluation. As sensors, in particular optical sensors for spatially resolved capture of remission properties of value documents in the visible and/or infrared spectral region, optical sensors for spatially resolved capture of transmission properties of value documents in the visible and/or infrared spectral region, ultrasonic sensors for spatially resolved capture of ultrasonic properties of value documents, can be employed, or be part of corresponding sensor systems in particular described hereinafter. However, it is also possible to employ other sensors, for example sensors for capturing magnetic properties of value documents.

According to an embodiment, a sensor system for examining value documents having a sensor for capturing physical properties of the value documents and forming a stream of the sensor data which describe the physical properties of the value documents can have an evaluation system according to the invention, wherein the sensor, for transferring the stream of sensor data, is connected to the first interface of a first one of the evaluation units, and the first interface of one, in each case, of the other evaluation units to a second interface of another one of the evaluation units. The evaluation units are then interlinked via the first and second interfaces and the connections therebetween with regard to the transfer of the sensor data stream or of parts of the sensor data stream. In this manner the sensor data stream can be received via the first one of the evaluation units and be relayed at least partly solely via the relaying device to the following evaluation unit or units, where the sensor data can be processed preferably at least partly in parallel. The subject matter of the invention is hence also a first method for evaluating a stream of sensor data that have been formed by means of at least one sensor for a plurality value documents and describe physical properties of the value documents, while employing at least two evaluation units, wherein the sensor data stream is received by means of a first one of the evaluation units and the sensor data stream, on the one hand, is relayed at least partly to a second one of the evaluation units and, on the other hand, evaluated in the first evaluation unit at least partly, and the second evaluation unit evaluates the sensor data stream transferred at least partly thereto at least partly in parallel with the evaluation of the sensor data stream in the first evaluation unit.

Different embodiments of such a sensor system having a sensor allow different types of parallelization, which are possible alternatively or cumulatively depending on the number of the evaluation units and/or the connection of the evaluation units via the first and second and/or fifth interfaces.

Thus, at least two of the evaluation units can be so adapted, preferably programmed, that they ascertain another value-document property, in each case, upon evaluation on the basis of the sensor data of the sensor data stream, with the value-document properties preferably being selected from the group comprising degree of soiling, damage, authenticity and a value-document identifier, in bank notes in particular the serial number. Upon employment of an ultrasonic sensor, limpness might also be ascertained as a value-document property. In particular, in the first method, the first evaluation unit can, upon evaluating, ascertain a first property of a value document and the second evaluation unit a second property of the value document different from the first, with the value-document properties preferably being selected from the group comprising degree of soiling, damage, authenticity and value-document identifier. With this kind of parallelization, both evaluation units employ the same sensor data, preferably of the same sensor, for which purpose the relaying device of the first one of the evaluation units can be accordingly adapted, in the case of a realization as a FPGA, programmed. The programming of the processors or the respectively stored program code of the evaluation units will differ, in contrast.

Possible is also a sensor system for capturing physical properties of a value document having a first sensor for capturing first physical properties of the value document, a second sensor for capturing second physical properties of the value document, and an evaluation system according to the invention, wherein the first interface of a first one of the evaluation units is connected to the first sensor for transferring a first sensor data stream with first sensor data of the first sensor, and the first interface of a second one of the evaluation units to the second sensor for transferring a second sensor data stream with second sensor data of the second sensor, and at least the first evaluation unit is adapted for at least partly evaluating the sensor data of the first sensor, and at least the second evaluation unit for at least partly evaluating the sensor data of the second sensor. This embodiment allows in particular the parallel evaluation of the sensor data of different sensors.

Preferably, the first one of the evaluation units and/or the second one of the evaluation units can be respectively connected via the second interface to first interfaces of identical evaluation units, which are connected with their third interfaces to the data bus. Identical evaluation units are understood to be evaluation units that are adapted like the first one and second one of the evaluation units, except for program code. Thus, the first one and/or second one of the evaluation units form with the evaluation devices connected via the second and first interfaces subsystems which are themselves evaluation systems according to the invention, in particular according to claims 1 to 6, but whose data buses are adapted as a common data bus.

In particular, the first physical properties can be pre-specified physical properties on a first side of the value document, and the second physical properties the pre-specified physical properties on a second side of the value document opposing the first side. For this purpose, the first and second sensors can be disposed on mutually opposing sides of a transport path along which value documents to be examined are transported. One then has a sensor system for capturing physical properties of a value document having a first sensor for capturing at least one physical property on a first side of the value document, a second sensor for capturing at least one physical property on a second side of the value document opposing the first side, and an evaluation system according to the invention, wherein the first interface of a first one of the evaluation units is connected to the first sensor for transferring a first sensor data stream with first sensor data of the first sensor, and the first interface of a second one of the evaluation units to the second sensor for transferring a second sensor data stream with second sensor data of the second sensor, and at least the first evaluation unit is adapted for at least partly evaluating the sensor data of the first sensor, and at least the second evaluation unit for at least partly evaluating the sensor data of the second sensor.

The subject matter of the invention is hence also a second method for evaluating a stream of sensor data that have been formed by means of at least two sensor for a plurality of value documents and describe physical properties of the value documents, while employing at least two evaluation units, wherein sensor data of the first one of the sensors for the value document and sensor data of the second one of the sensors for the value document are evaluated in different evaluation units at least partly in parallel, with preferably the sensor data of the first sensor comprising sensor data for physical properties on a first side of the value document and the sensor data of the second sensor for physical properties on a second side of the value document opposing the first side, with particularly preferably the physical properties having the same type on both sides of the value document, for example remission properties for optical radiation.

In the methods, the evaluation units can in particular evaluate sensor data for the same value document at least partly in parallel. For this purpose, the evaluation units can be accordingly adapted, preferably programmed.

The sensor system can further have two subsystems, with a first subsystem comprising the first one of the evaluation units and a second subsystem the second one of the evaluation units; at least one of the subsystems can have at least one further evaluation unit whose third interface is connected to the data bus and whose first interface is connected to the second interface of another or the other evaluation unit of the same subsystem. Said first interface is then not directly connected to one of the sensors. Thus, when the relaying devices are adapted accordingly, an at least partial relaying of the sensor data stream from another or the other evaluation unit of the same subsystem to the further evaluation unit is possible. This allows a further parallelization of evaluations.

Further, in the evaluation system, the second interface can be adapted for receiving part of the sensor data stream or of another sensor data stream, and the relaying device be so actuatable or programmable that sensor data received via the second interface are relayed at least partly to the processor and/or to storage in the working memory. Preferably, the relaying device can for this purpose respectively have a suitable, programmable FPGA. This embodiment allows at least parts of sensor data streams of two sensors to be processed in one evaluation unit.

The following embodiment is then especially advantageous. In the sensor system, wherein the evaluation system is adapted as described in the last paragraph, a second interface of an evaluation unit of the first subsystem can be connected to a second interface of an evaluation unit of the second subsystem, with the relaying device of the evaluation unit of the second subsystem being adapted for relaying sensor data received from the first interface to the processor and/or to storage of at least part of the sensor data of the sensor data stream in the working memory of the same evaluation unit. It is thus possible to employ at least part of both sensor data streams in one evaluation unit, which is advantageous in particular with large data streams.

A further embodiment likewise employs an evaluation system that was described in the next to last paragraph. A sensor system according to the invention can have a further sensor for capturing further physical properties of the value document; further, in the sensor system, the evaluation system can be adapted as described in the next to last paragraph, and the further sensor be connected to the second interface of an evaluation unit, with the relaying device of the evaluation unit being adapted for relaying sensor data received from the first interface to the processor and/or to storage of at least part of the sensor data of the sensor data stream in the working memory of the same evaluation unit. In this manner, the sensor data stream of the further sensor can be evaluated by means of an evaluation unit that is not working to full capacity through the processing of at least part of another sensor data stream, thereby resulting in a further possibility for parallel processing.

It is also possible that the evaluation system has altogether N subgroups each with at least one evaluation unit, and that the sensor data stream successively has sensor data for consecutive value documents, and that the evaluation units are so adapted that the sensor data for one value document are evaluated by evaluation units of only one subgroup in each case, and preferably each subgroup evaluates the sensor data for value documents spaced by N value documents in each case. In other words, a subgroup of evaluation units, which has one or more of the evaluation units identically adapted in the above-described sense, evaluates the sensor data for one value document and every Nth further value document, where N is a natural number greater than 0. In this embodiment, the relaying devices are so programmed that they feed the sensor data for one value document and every Nth further value document for one of the subgroups to the working memory or memories of the evaluation unit or evaluation units of the subgroups. In the stated methods, one of the evaluation units can hence also evaluate sensor data for a first value document and another one of the evaluation units sensor data for a value document following the first value document, at least partly in parallel.

As described above, it may be expedient or even necessary, depending on the evaluation method, that one of the evaluation units employs evaluation data of another one of the evaluation units. In the methods, it is hence preferred that a second one of the evaluation units receives evaluation data ascertained by a first one of the evaluation units and employs them upon the evaluation.

Thus, in the sensor system, at least one of the evaluation units and at least one other one of the evaluation units can be so programmed that the at least other one of the evaluation units receives evaluation data from the other one of the evaluation units via the data bus. In particular, the evaluation unit that is connected via the first interface immediately to the sensor or one of the sensors can feed evaluation data, for example about the type of the value document, in bank notes the currency and denomination, and, depending on the currency, the issue of the bank note, where applicable, to the other evaluation units, in order that the latter can employ the information about the type upon their evaluation. In the case of at least two sensors being employed, at least one of the evaluation units that receive sensor data of the first sensor and at least one of the evaluation units that receive sensor data of the second sensor can also be so programmed that at least one of the evaluation units that receives the first sensor data receives, via the data bus, evaluation data from one of the evaluation units that receives the second sensor data.

In particular when the evaluation data cannot be employed for all other evaluation units, or the evaluation data must be made available to at least one other evaluation unit very fast, it is advantageous that, in the sensor system, at least one of the evaluation units and at least one other one of the evaluation units are connected via the fifth interfaces and so programmed that the at least other one of the evaluation units receives evaluation data from the other one of the evaluation units via the fifth interfaces. Upon employment of two sensors, at least one of the evaluation units that receive sensor data of the first sensor and at least one of the evaluation units that receive sensor data of the second sensor can particularly preferably be connected via the fifth interfaces and so programmed that at least one of the evaluation units that receives the first sensor data receives, via the fifth interfaces, evaluation data from one of the evaluation units that receives the second sensor data. Such a connection between the fifth interfaces can be established in particular via the above-described plug connections by means of a cable with corresponding plug connector elements.

The described systems are suited in particular for use in value-document processing apparatuses which transport value documents, for processing, past at least one sensor, whereby a sensor data stream is generated. The subject matter of the invention is hence also an apparatus for processing value documents having a feeding device for feeding singled value documents, an output device for receiving processed value documents, a transport device for transporting singled value documents, fed by the feeding device, along a transport path from the feeding device to the output device, and a sensor system according to the invention, whose sensor or sensors are disposed on the transport and which is adapted for capturing a stream of sensor data for value documents transported past the sensor system.

BRIEF DESCRIPTION OF THE DRAWINGS

The invention will hereinafter be explained further by way of example with reference to the drawings. There are shown.

DETAILED DESCRIPTION OF VARIOUS EMBODIMENTS

Figure 1:
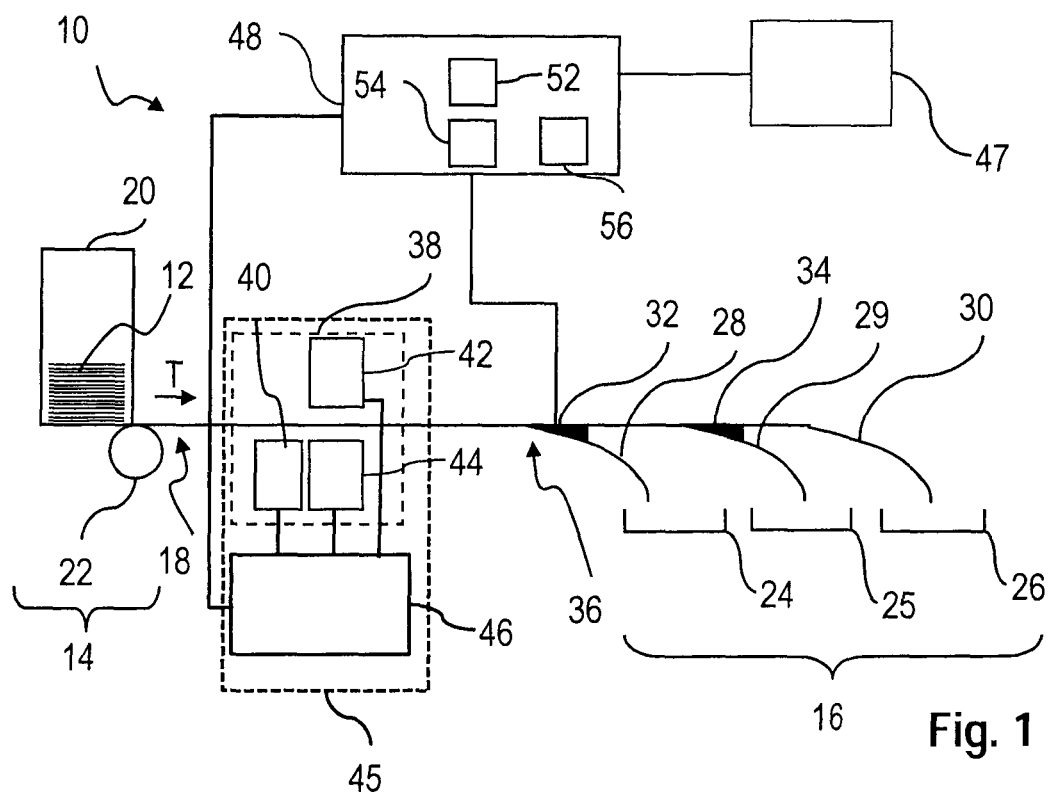
FIG. 1 a schematic view of a value-document processing apparatus in the form of a bank-note sorting apparatus, FIG. 2 a schematic block representation of a sensor system of the value-document processing apparatus in FIG. 1, FIG. 3 a schematic view of a portion of the sensor system in FIG. 2, FIG. 4 a schematic block representation of a second exemplary embodiment for a sensor system of a value-document processing apparatus, and FIG. 5 a schematic block representation of a third exemplary embodiment for a sensor system of a value-document processing apparatus.

A value-document processing apparatus 10 in FIG. 1, in this example an apparatus for processing value documents 12 in the form of bank notes, is adapted for sorting value documents in dependence on the recognition of the authenticity and the state and, where applicable, the currency and denomination of processed value documents.

The apparatus 10 has in or on a housing (not shown) a feeding device 14 for feeding value documents, an output device 16 for receiving processed, i.e. sorted, value documents, and a transport device 18 for transporting singled value documents from the feeding device 14 to the output device 16.

The feeding device 14 comprises in this example an input pocket 20 for a value-document stack and a singler 22 for singling value documents out of the value-document stack in the input pocket 20 and for feeding the singled value documents to the transport device 18.

The output device 16 comprises in this example three output portions 24, 25 and 26 into which processed value documents can be sorted according to the result of processing. In this example, each of the portions comprises a stack pocket and a stacking wheel (not shown) by means of which fed value documents can be deposited in the stack pocket.

The transport device 18 has at least two branches, in this example three branches 28, 29 and 30, at whose ends one of the output portions 24, 25, 26 is respectively disposed, and, at the branching points, gates 32 and 34 controllable via actuating signals, by means of which value documents are feedable to the branches 28 to 30 and thus to the output portions 24 to 26 in dependence on actuating signals.

On a transport path 36, defined by the transport device 18, between the feeding device 14, in this example more precisely the singler 22, and the first gate 32 after the singler 22 in the transport direction, there is disposed a sensor assembly 38 which measures physical properties of the value documents while value documents are being transported past and forms sensor signals rendering the measuring results. In this example, the sensor device 38 has three sensors, i.e. on mutually opposing sides of the transport path 36 respectively an optical remission sensor 40, 42, which respectively captures a remission colored image and a remission IR image of the value document, and an optical transmission sensor 44, which captures a transmission colored image and a transmission IR image of the value document. In other exemplary embodiments there can also be provided a transmission ultrasonic sensor, which captures or measures ultrasound transmission properties of the value document in a spatially resolved manner. The sensor signals formed by the sensors correspond to sensor data or raw data of the sensors which, depending on the sensor, may have already been subjected to correction, for example in dependence on calibrating data and/or noise properties.

The sensors 40, 42 and 44 are part of a sensor system 45 which has a hereinafter more closely described evaluation system 46 connected to the sensors via data connections. The data connections are realized in the exemplary embodiment employing LVDS (low voltage differential signaling) in connection with Camera Link.

For displaying operator control data and operating data, the value-document processing apparatus 10 has a display device 47, which is realized in this example by a touch-sensitive display device (touch screen). The display device 47 hence serves as an input/output device of the apparatus.

A control device 48 is connected via signal connections to the sensor system 45, the display device 47 and the transport device 18, in particular the gates 32 and 34.

The value-document processing apparatus 10 is adapted for sorting value documents in dependence on their state or quality and their authenticity and, where applicable, their currency and denomination. In particular, the evaluation system 46 and the control device 48 are adapted accordingly therefor.

For sorting, value documents are singled out of the feeding device 14 and transported past the sensor assembly 38 or therethrough. The sensor assembly 38 captures or measures physical properties of the value documents respectively transported therepast or therethrough, and forms sensor signals or a stream of sensor data which describe the measurement values for the physical properties. The evaluation device 46 and the control device 48 classify a value document in one of pre-specified authenticity classes and one of pre-specified state classes in dependence on the sensor signals of the sensor device 38 for the value document and on classification parameters stored in the evaluation device; by emitting actuating signals, the control device 48 so actuates the transport device 18, here more precisely the gates 32, 34, that the value document is output in accordance with its class ascertained upon the classification into an output portion of the output device 16 associated with the class. The association with one of the pre-specified authenticity classes or state classes or the classification is effected here in dependence on at least one pre-specified authenticity criterion or state criterion.

Figure 2:
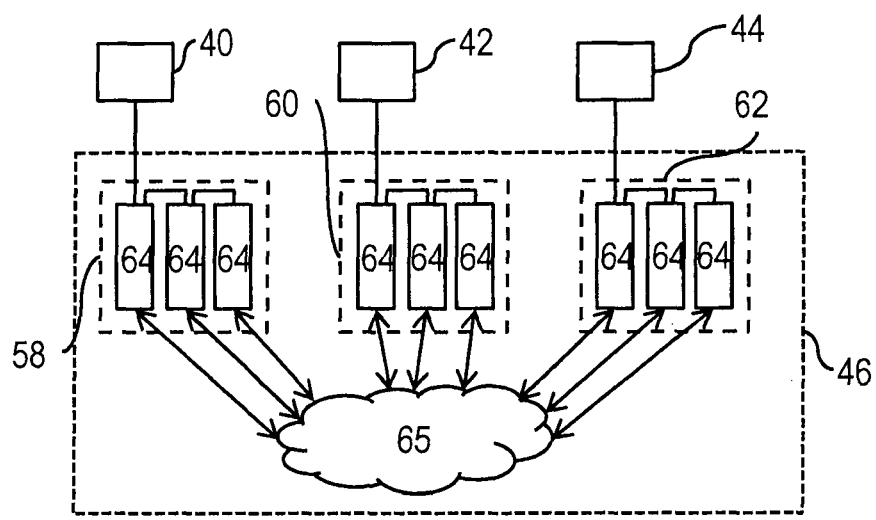
Figure 3:
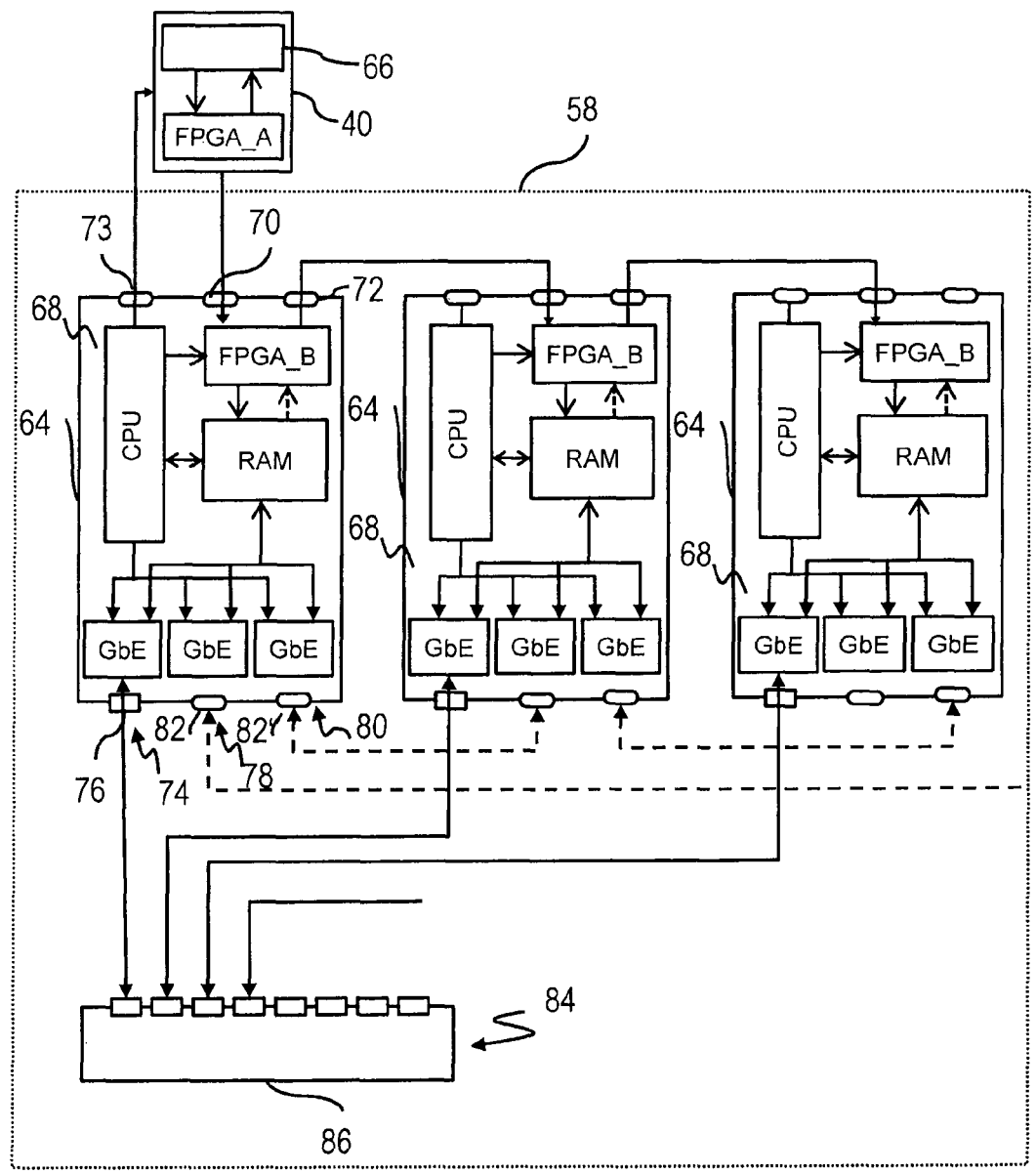

The sensor system 45 is shown more precisely in FIGS. 2 and 3. As already explained, the sensors 40, 42 and 44 are remission or transmission sensors, with an illumination (not shown in the figures) of the remission sensor 42 also serving as illumination of the transmission sensor 44 in the present exemplary embodiment. The evaluation system 46 has three subsystems 58, 60 and 62 as well as communication devices 64. The subsystem 58 is connected to the remission sensor 40, the subsystem 60 to the remission sensor 42, and the subsystem 62 to the transmission sensor 44, via one data connection in each case. The subsystems have at least one evaluation unit in each case, in this example three evaluation units 64 in each case, which are identically adapted except for data stored therein and program code stored therein. The evaluation units of each one of the subsystems are respectively interconnected via data connections with great bandwidth, so that a sensor data stream generated by the respective sensor can be relayed to all evaluation units of the respective subsystem. Furthermore, the evaluation devices are interconnected via communication devices 65 to be able to exchange data with each other.

The sensors 40, 42 and 44 are constructed analogously with regard to the capture of optical radiation, so that it will suffice to describe the camera part of only one of the sensors and the construction of the corresponding subsystem of the evaluation system.

Reference is made here to FIG. 3, in which optionally present data connections are represented by dashed lines. Further, data connections not ending at an interface in FIG. 3 represent connections to evaluation units of other subsystems.

As shown very schematically in FIG. 3, the sensors possess more precisely an image data capturing device 66, which in this example comprises an optic, a line-scan camera and further signal electronics, as well as an FPGA FPGA_A. The FPGA is adapted for controlling the image data capturing device 66 and for transmitting a formatted sensor data stream with sensor data which describe captured images to the evaluation units. Optionally, the FPGA can also be adapted for further tasks, for example a preprocessing of the raw data or a marking of objects in the data stream. The sensor is controlled by one of the evaluation units of the respective subsystem and possesses a corresponding data interface for this purpose.

Since the evaluation units are identical except for their programming, as described above, their construction will be described only by the example of the evaluation unit on the left in FIG. 3.

The evaluation units 64 have, on a circuit board 68, a first interface 70 for receiving a sensor data stream with sensor data, a second interface 72 for transferring at least part of the sensor data stream, a working memory RAM, and a relaying device FPGA_B connected via data connections to the first and second interfaces 70, 72 as well as directly to the working memory RAM for receiving a sensor data stream received via the first interface 70, at least partial relaying to the second interface 72 and the at least partial relaying to storage of at least part of the data of the sensor data stream in the working memory RAM. In this exemplary embodiment there is further provided a data connection from the working memory RAM to the relaying device FPGA_B via which the relaying device FPGA_B can read data out of the working memory RAM. The relaying device FPGA_B is realized in this exemplary embodiment as a programmable logic gate circuit (field programmable gate array or FPGA) which can be programmed depending on the evaluation method.

The first and second interfaces 72, in this exemplary embodiment, respectively comprise attachment elements for a plug connection to a suitable data line, in this example a cable for interconnecting the relaying devices.

Further, a processor CPU connected to the working memory RAM via a data connection is held on the circuit board 68 for evaluating the sensor data in the working memory RAM. The processor CPU executes program code which is stored in a memory (not shown in the figures) and upon whose execution by the processor a pre-specified evaluation method or a corresponding part of an evaluation method is carried out.

The processor CPU is connected via a data connection to a fourth interface 73 which is connected via a control data connection to the sensor 40, so that the processor CPU can control the sensor.

Further, there is provided a third interface 74 for transferring data, in particular evaluation data, from the processor CPU and/or out of the working memory RAM and/or for receiving data, in particular evaluation data, for employment by the processor CPU and/or for storage in the working memory RAM. The third interface 74 is connected for this purpose to the processor CPU and the working memory RAM via data connections. The third interface 74 comprises in this exemplary embodiment a gigabit network module GbE and an attachment element 76 as well as corresponding program code.

The evaluation unit 64 has two fifth interfaces 78 and 80 which are likewise connected via data connections to the processor CPU and the working memory RAM and serve for receiving data, in particular evaluation data such as for example intermediate results of evaluations in other evaluation units, or transferring data, in particular evaluation data, to other evaluation units. The fifth interfaces 78 and 80, in this exemplary embodiment, respectively comprise a gigabit network module GbE and an attachment element 82, 82' for a plug connection, in this example a receiving means for a network plug of a Gigabit Ethernet cable, as well as corresponding program code. The fifth interfaces 78, 80 are provided for establishing point-to-point connections between two evaluation units. They are provided, when they are connected by corresponding cables to corresponding interfaces of other evaluation units 64, for exchanging relatively large amounts of data or time-critical data packets between two evaluation units interconnected via said interfaces and then form a part of the communication devices 65.

The evaluation system 45 further possesses a data bus 84, which likewise forms a part of the communication devices 65, and is connected to the third interface 74. The data bus 84 and the third interfaces 74 are so adapted that data can be written to the data bus or received therefrom via the third interfaces 74. As indicated by FIGS. 2 and 3, all evaluation units 64 of the subsystems are attached to the same data bus 84 to be able to exchange data via said bus. All evaluation units, i.e. not only those of one of the subsystems, are hence interconnected by the data bus, so that an arbitrary cross-communication is possible between all evaluation devices. Via said data bus there is preferably exchanged information with small and average data traffic, for example status and control information as well as intermediate or also final results of the evaluations.

Further, the data bus 84 is connected to the control device 48, in order that evaluation results can be transferred thereto.

In the present example, the data bus 84 comprises a Gigabit Ethernet switch 86 with corresponding terminals, the third interfaces being adapted accordingly.

In this exemplary embodiment, the evaluation units are inserted into a rack (not shown) which also has the data bus 84. The evaluation system can thereby be simply extended by inserting a new evaluation unit. The fifth interfaces and preferably also the first and second interfaces are so disposed that connections between the corresponding interfaces of different evaluation units can be established solely by subsequently inserting plug connectors of a data cable, without any need to remove the respective evaluation units from the rack.

In this exemplary embodiment, the relaying devices FPGA_B and the first interfaces are adapted so as to receive sensor data streams of the sensors while employing LVDS (low voltage differential signaling) in connection with Camera Link. Further, the relaying devices FPGA_B are adapted for receiving a stream of sensor data fed via the first interface 70, duplicating or copying it and relaying it, preferably practically without lag, via the second interface 72 to a further evaluation unit, if such is connected to the second interface. Further, the data stream is written to the working memory RAM. Through connection of a second interface 72, in each case, of an evaluation device to the first interface 70 of another evaluation device of the same subsystem, for example with a corresponding data cable with plug connectors, it is thus possible to interlink an arbitrary number of evaluation units of the same kind. The first interface of a first one of the evaluation units is connected to the respective sensor via a data connection, so that its relaying device can receive the sensor data stream and relay it to the other evaluation units, as described. In this example, the stream of sensor data is distributed by the first evaluation unit of a subsystem to the two other evaluation units of the same subsystem. Thus, the same image data can be processed by a plurality of evaluation units or their processors in parallel. The processors CPU respectively access the sensor data in the respective working memory RAM for this purpose.

In this exemplary embodiment, the data streams of the three sensors 40, 42 and 44 are respectively fed to a subsystem connected to the respective sensor, so that in particular an at least partly parallel evaluation of the respective sensor data is possible. More precisely, the evaluation units are so adapted, in this example programmed, that the sensor data from the sensor data stream that have been captured for a, i.e. here the same, value document are evaluated at least partly in parallel.

In particular, the evaluation devices are so adapted, in this example programmed, that at least partly sensor data of the remission sensor 40 for a first side of a value document and sensor data of the remission sensor 42 for a second side of the value document opposing the first side can be evaluated at least partly in parallel.

The evaluation in the evaluation system is effected in this exemplary embodiment only partly in parallel.

In the present exemplary embodiment, for example the evaluation unit 64 of the subsystem 58, said unit being connected immediately to the remission sensor 40, more precisely the processor CPU of said unit, first carries out a currency and denomination recognition while employing the sensor data of the sensor 40, i.e. image data for the first side of the value document, for which purpose said processor executes corresponding program code stored in the evaluation unit. When this has been effected, the processor CPU transfers data describing the currency and the denomination as evaluation data to the data bus 64, so that all evaluation devices, in particular also those of the other subsystems 60 and 62, can use these results further.

In the present exemplary embodiment, the evaluation unit 64 of the subsystem 62, said unit being connected immediately to the transmission sensor 44, more precisely the processor CPU of said unit, first carries out an examination of the value document for defects, in this example tears, holes and at least apparently torn-off corners, while employing the sensor data of the sensor 44 and the currency and denomination data, i.e. transmission image data of the value document, for which purpose the processor CPU executes corresponding program code stored in the evaluation unit. When this has been effected, the processor CPU transfers corresponding evaluation data to the data bus 64, so that all evaluation devices, in particular also those of the other subsystems 58 and 60, can use these results further.

Other evaluation units of the subsystem 62 evaluate at least partly in parallel the IR transmission image and the transmission image in the visible region for the presence of a watermark as well as a security thread while employing the data of the subsystem 58 on currency and denomination.

The evaluation units of the subsystems 58 and 60, said units being directly connected immediately to the sensors 40, 42, or the respective processors CPU of said units, evaluate the sensor data with regard to the printed image. The evaluation data of the subsystem 62 are received via the data bus 84 and taken into consideration upon the partly parallel evaluation.

Other evaluation units of the subsystems 58 and 60, or the processors CPU of said units, evaluate the sensor data with respect to the presence of stains, for which purpose they execute corresponding program code which is stored in the evaluation units.

While employing the sensor data of the images of the remission sensors 40 and 42 and the defect data, other evaluation units of the subsystems 58 and 60 ascertain whether a defect on a corner is a dog's-ear, i.e. a folded-down corner, or the corner is missing, for example by having been torn off. They exchange the data necessary therefor via their fifth interfaces connected via a data line.

At least partly in parallel, evaluation units of the subsystems 58 and 60 evaluate the sensor data available to them in their working memories for the presence of soiling while employing transmission data of the subsystem 62. The relatively large amounts of data necessary therefor are transferred between a corresponding evaluation unit of the subsystem 62 and a respective evaluation unit of the subsystems 58 and 60 via point-to-point connections. The point-to-point connections are established while employing an inserted cable by means of the fifth interfaces 78 and 80 of the evaluation units to be connected.

Figure 4:
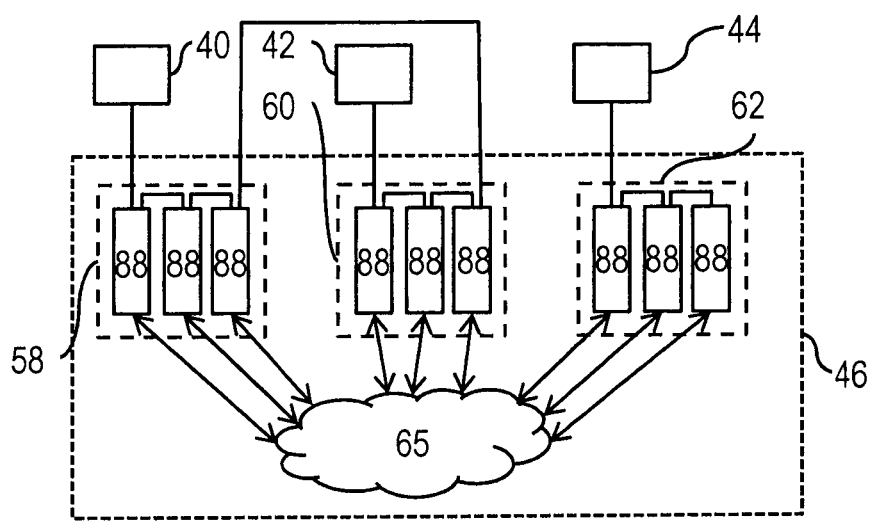
Figure 5:
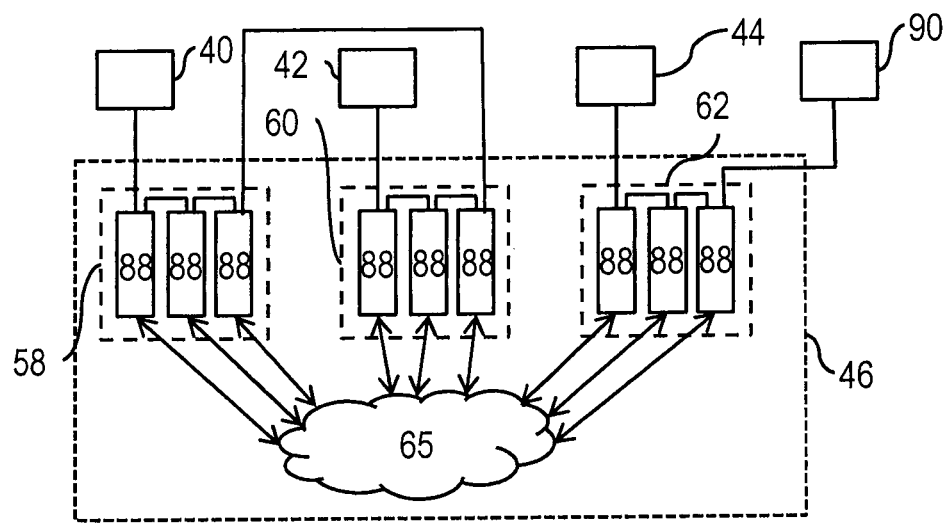

A second exemplary embodiment in FIG. 4 differs from the first exemplary embodiment in that the evaluation units 64 are replaced by evaluation units 88. The evaluation units 88 differ from the evaluation units 64, besides in the programming, in that the interfaces 72 are also adapted for receiving a sensor data stream and the relaying devices FPGA_B are replaced by relaying devices FPGA_B', which are now adapted as FPGAs which are so programmable that sensor data received via the second interface are relayed at least partly to the processor and/or to storage in the working memory. In the example in FIG. 4, the relaying device of the evaluation unit 88 of the subsystem 64, whose second interface is not connected to an evaluation unit 88 of the same subsystem, the evaluation unit on the right in FIG. 4, is programmed to receive a data stream from the second interface of the evaluation unit 88 of the subsystem 60, which is not connected to the first interface of an evaluation unit of the same subsystem 60. The two interfaces are connected for this purpose via a data connection.

The relaying device of the stated evaluation unit 88 of the subsystem 60 is adapted or programmed for relaying the sensor data stream of the sensor 42 to the stated evaluation unit 64' of the first subsystem 58.

This evaluation unit, which now receives sensor data streams both of the sensor 40 (via the first interface) and of the sensor 42 (via the second interface), can store sensor data of both streams in the working memory RAM through corresponding programming of the relaying device. The evaluation unit 88 is adapted, through corresponding programming of the processor CPU, for ascertaining a serial number of a bank note on the basis of the sensor data of the two sensors for capturing an image of the front side and the back side of the bank note, i.e. images of the front side and back side. Other evaluations can be effected at least partly in parallel as in the first exemplary embodiment.

A third exemplary embodiment differs from the second exemplary embodiment in that there is also provided a fourth sensor 90, in this example a spatially resolving magnetic sensor. It is now connected to the second interface 72 that was still free in the second exemplary embodiment. The relaying device FPGA_B' of the evaluation unit 88 connected to the sensor 90 is so programmed that it stores the sensor data stream from the second interface in the working memory RAM of the same evaluation unit.

The evaluation unit is now so programmed that it evaluates not only part of the sensor data of the sensor 44, but also the sensor data of the sensor 90.

A further exemplary embodiment differs from the first exemplary embodiment in that in each subsystem each evaluation device evaluates the sensor data for another value document. Thus, for example the evaluation unit of each subsystem that is respectively connected to the sensor can, beginning with a first value document, evaluate the sensor data for each following third value document. In other words, these first evaluation units evaluate the sensor data for the first, fourth, seventh, etc., value document. The next evaluation units of the subsystems that are directly connected to the first evaluation units via the first and second interfaces evaluate the sensor data for the second, fifth, eighth, etc., value document, and the other, third evaluation units the sensor data for the third, sixth, ninth, etc., value document. In the general case of n evaluation units in each of the subsystems, mutually corresponding evaluation units of the subsystems would evaluate the sensor data of every nth value document, beginning with one value document. The evaluation is, in so doing, effected in the subsystems respectively at least partly in parallel.

For this purpose, the relaying devices FPGA_B of the evaluation units of the subsystems are so programmed that sensor data of the stream are transferred selectively to the working memory of the respective evaluation unit. More precisely, one, in each case, of the evaluation units of each subsystem is so configured, through the adapting, here programming, of the relaying device, that it evaluates every first, fourth, etc., or only every second, fifth, etc., or only every third, sixth, etc., value document. A communication between the evaluation units within a subsystem via the fifth interfaces is then unnecessary. The data connections between the evaluation units of different subsystems are so adjusted, however, that each evaluation unit can have the necessary data of the corresponding evaluation unit of another subsystem. The evaluation functions of the subsystems as described in the preceding exemplary embodiment are then carried out on only one respective evaluation unit of the respective subsystem. During the evaluation of the sensor data for a first value document, the evaluation of the sensor data for a directly following value document by means of another evaluation unit can then already begin in parallel. The total time span for carrying out the evaluation for a value document must be so short that gates of the transport device can be actuated in time after the capture of the sensor data for a value document and their evaluation.

In further exemplary embodiments, the relaying device FPGA_B can further be so adapted, in the example programmed, that it also carries out a further preprocessing of the sensor data and/or carries out an additional processing of data that are already deposited in the working memory RAM.

In other exemplary embodiments, there can be provided for example only one sensor with the corresponding subsystem. Then the other subsystems can be omitted.

In yet other exemplary embodiments, the subsystems can have different numbers of evaluation units. In particular, a subsystem only needs to have one evaluation unit. The data connections between the subsystems then remain unchanged, where applicable.

Yet other exemplary embodiments differ from the above-described exemplary embodiments solely in that the data bus is adapted as a data bus on the basis of 10-Gigabit-Ethernet, 40-Gigabit-Ethernet, 100-Gigabit-Ethernet, RapidIO, PCI, PCIe, FireWire, Thunderbolt or Fibre Channel. The third interfaces 74 are then adjusted accordingly.

Still other exemplary embodiments differ from the previously described exemplary embodiments in that the fifth interfaces are adapted on the basis of 10-Gigabit-Ethernet, 40-Gigabit-Ethernet, 100-Gigabit-Ethernet, RapidIO, PCI, PCIe, FireWire, Thunderbolt or Fibre Channel.

The invention claimed is:

1. A system for evaluating a stream of sensor data that have been formed by means of at least one hardware sensor disposed within a value-document processing system for a plurality of value documents and describe physical properties of the value documents in real time, comprising at least two evaluation units and a data bus;
   with each of the evaluation units having:
   a first interface for receiving at least part of the sensor data stream with the sensor data;
   a second interface for transferring at least part of the sensor data stream;
   a working memory;
   at least one processor connected to the working memory for evaluating the sensor data in the working memory to generate evaluation data;
   a third interface being connected to the processor and/or the working memory; and
   a relaying device connected to the first and the second interfaces and directly or indirectly to the working memory, said relaying device being configured to receive the sensor data stream received via the first interface, to at least partially relay to the second interface the received sensor data stream and to at least partially relay to the processor the received sensor data stream and/or to store the at least part of the sensor data of the received sensor data stream in the working memory;
   with the data bus being connected respectively to the third interface, the third interface being configured to receive or transmit evaluation data via the data bus.

2. The evaluation system according to claim 1, wherein the processor is connected to the relaying device via a control connection in order to control it.

3. The evaluation system according to claim 1, wherein at least one of the evaluation units has a fourth interface connected to the processor for transferring control data to a sensor.

4. The evaluation system according to claim 1, wherein at least one of the evaluation units has a fifth interface connected to the processor and/or the working memory for receiving and/or transferring evaluation data.

5. The evaluation system according to claim 1, wherein at least one of the interfaces has an attachment element for a plug connection.

6. The evaluation system according to previous claim 1, wherein the evaluation units are identically adapted except for program code stored therein.

7. The evaluation system according to claim 1, wherein the second interface is adapted for receiving part of the sensor data stream or another sensor data stream, and the relaying device is so actuatable or programmable that sensor data received via the second interface are relayed at least partly to the processor and/or to storage in the working memory.

8. A sensor system for examining value documents having a sensor for capturing physical properties of the value documents and forming a stream of sensor data which describe the physical properties of the value documents, and an evaluation system according to claim 1, wherein the sensor, for transferring the stream of sensor data, is connected to the first interface of a first one of the evaluation units, and the first interface of one, in each case, of the other evaluation units to a second interface of another one of the evaluation units.

9. The sensor system according to claim 8, wherein at least two of the evaluation units are so adapted, preferably programmed, that they ascertain another value-document property, in each case, upon evaluating on the basis of the sensor data of the sensor data stream, with the value-document properties preferably being selected from the group comprising degree of soiling, damage, authenticity and value-document identifier.

10. The sensor system according to claim 8, wherein the evaluation system has altogether N subgroups each with at least one evaluation unit, and wherein the sensor data stream successively has sensor data for consecutive value documents, wherein the evaluation units are so adapted that the sensor data for one value document are evaluated by evaluation units of only one subgroup in each case, and preferably each subgroup evaluates the sensor data for value documents spaced by N value documents in each case.

11. A sensor system for capturing physical properties of a value document having
a first sensor for capturing first physical properties of the value document, a second sensor for capturing second physical properties of the value document, and an evaluation system according to claim 1, wherein the first interface of a first one of the evaluation units is connected to the first sensor for transferring a first sensor data stream with first sensor data of the first sensor, and the first interface of a second one of the evaluation units to the second sensor for transferring a second sensor data stream with second sensor data of the second sensor, and at least the first evaluation unit is adapted for at least partly evaluating the sensor data of the first sensor, and at least the second evaluation unit for at least partly evaluating the sensor data of the second sensor.

12. The sensor system according to claim 11, wherein the first physical properties are pre-specified physical properties on a first side of the value document, and the second physical properties are the pre-specified physical properties on a second side of the value document opposing the first side.

13. The sensor system according to claim 11, which has two subsystems, with a first subsystem comprising the first one of the evaluation units and a second subsystem the second one of the evaluation units, with at least one of the subsystems having at least one further evaluation unit whose third interface is connected to the data bus and whose first interface is connected to the second interface of another or the other evaluation unit of the same subsystem.

14. The sensor system according to claim 11, wherein the evaluation system is adapted such that the second interface is adapted for receiving part of the sensor data stream or another sensor data stream, and the relaying device is so actuatable or programmable that sensor data received via the second interface are relayed at least partly to the processor and/or to storage in the working memory, and a second interface of an evaluation unit of the first subsystem is connected to a second interface of an evaluation unit of the second subsystem, with the relaying device of the evaluation unit of the second subsystem being adapted for relaying sensor data received from the first interface to the processor and/or to storage of at least part of the sensor data of the sensor data stream in the working memory of the same evaluation unit.

15. The sensor system according to claim 8, wherein at least one of the evaluation units and at least one other one of the evaluation units are so programmed that the at least other one of the evaluation units receives evaluation data from the other one of the evaluation units, via the data bus.

16. The sensor system according to claim 8, wherein at least one of the evaluation units and at least one other one of the evaluation units are connected via the fifth interfaces and so programmed that the at least other one of the evaluation units receives evaluation data from the other one of the evaluation units, via the fifth interfaces.

17. The sensor system according to claim 8, which has a further sensor for capturing further physical properties of the value document, and wherein the evaluation system is adapted such that the second interface is adapted for receiving part of the sensor data stream or another sensor data stream, and the relaying device is so actuatable or programmable that sensor data received via the second interface are relayed at least partly to the processor and/or to storage in the working memory, and the further sensor is connected to the second interface of an evaluation unit, with the relaying device of the evaluation unit being adapted for relaying sensor data received from the first interface to the processor and/or to storage of at least part of the sensor data of the sensor data stream in the working memory of the same evaluation unit.

18. An apparatus for processing value documents having
a feeding device for feeding singled value documents, an output device for receiving processed value documents, a transport device for transporting singled value documents, fed by the feeding device, along a transport path from the feeding device to the output device, and
a sensor system according to claim 8, whose sensor or sensors are disposed on the transport and which is adapted for capturing a stream of sensor data for value documents transported past the sensor system.

19. The system of claim 1, wherein the sensor data of the sensor data stream are duplicated prior to being relayed by the relaying device to the first and second interfaces.

20. A method for evaluating a stream of sensor data that have been formed by means of at least two sensors for a plurality of value documents and describe physical properties of the value documents, while employing at least two hardware-based evaluation units that share the sensor data, wherein
sensor data of the first one of the sensors for a value document and sensor data of the second one of the sensors for the same value document are evaluated in different evaluation units at least partly in parallel, with preferably the sensor data of the first sensor comprising sensor data for physical properties on a first side of the value document and the sensor data of the second sensor for physical properties on a second side of the value document opposing the first side.

21. A method for evaluating a stream of sensor data that have been formed using at least one sensor for a plurality of value documents and describe physical properties of the value documents, while employing at least two hardware-based evaluation units, wherein
the sensor data stream is received by means of a first one of the evaluation units and the sensor data stream, on the one hand, is relayed at least partly to a second one of the evaluation units and, on the other hand, evaluated in the first evaluation unit at least partly, and the second evaluation unit evaluates the sensor data stream at least partly transferred thereto at least partly in parallel with the evaluation of the sensor data stream in the first evaluation unit with respect to the same value document.

22. The method according to claim 21, wherein the first evaluation unit, upon evaluating, ascertains a first property of a value document and the second evaluation unit a second property of the value document different from the first, with the value-document properties preferably being selected from the group comprising degree of soiling, damage, authenticity and value-document identifier.

23. The method according to claim 20, wherein the evaluation units evaluate sensor data for the same value document at least partly in parallel.

24. The method according to claim 20, wherein a second one of the evaluation units receives evaluation data ascertained by a first one of the evaluation units and employs them upon the evaluation.

25. The method according to claim 20, wherein one of the evaluation units evaluates sensor data for a first value document and another one of the evaluation units sensor data for a value document following the first value document, at least partly in parallel.

\* \* \* \* \*